United States Patent
Oshima et al.

(10) Patent No.: US 12,404,727 B2
(45) Date of Patent: Sep. 2, 2025

(54) OIL-WELL METAL PIPE

(71) Applicants: NIPPON STEEL CORPORATION, Tokyo (JP); VALLOUREC OIL AND GAS FRANCE, Aulnoye-Aymeries (FR)

(72) Inventors: Masahiro Oshima, Tokyo (JP); Masanari Kimoto, Tokyo (JP); Alexandre Antoine, Meudon (FR); Daniel Munoz, Meudon (FR)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 18/683,558

(22) PCT Filed: Aug. 26, 2022

(86) PCT No.: PCT/JP2022/032244
§ 371 (c)(1),
(2) Date: Feb. 14, 2024

(87) PCT Pub. No.: WO2023/037910
PCT Pub. Date: Mar. 16, 2023

(65) Prior Publication Data
US 2024/0352806 A1   Oct. 24, 2024

(30) Foreign Application Priority Data
Sep. 7, 2021   (JP) ................. 2021-145098

(51) Int. Cl.
*F16L 58/18* (2006.01)
*C25D 3/22* (2006.01)
(Continued)

(52) U.S. Cl.
CPC .............. *E21B 17/042* (2013.01); *C25D 3/22* (2013.01); *C25D 5/48* (2013.01); *C25D 7/04* (2013.01)

(58) Field of Classification Search
CPC ....... F16L 15/00; F16L 15/001; F16L 15/006; F16L 58/18; F16L 58/182
See application file for complete search history.

(56) References Cited

U.S. PATENT DOCUMENTS

2019/0331262 A1 * 10/2019 Goto .................. C25D 5/12
2020/0190683 A1 * 6/2020 Kimoto ............... C25D 5/56

FOREIGN PATENT DOCUMENTS

WO   2016170031 A1   10/2016

* cited by examiner

*Primary Examiner* — Aaron M Dunwoody
(74) *Attorney, Agent, or Firm* — Greer, Burns & Crain, Ltd.

(57) ABSTRACT

An oil-well metal pipe according to the present disclosure includes: a pipe main body that includes a pin which includes a pin contact surface including an external thread part and which is formed at a first end portion, and a box which includes a box contact surface including an internal thread part and which is formed at a second end portion; and a Zn—Ni alloy plating layer which is formed on at least one of the pin contact surface and the box contact surface. The X-ray diffraction intensities of the Zn—Ni alloy plating layer satisfy Formula (1).

$$I_{18}/(I_{18} + I_{36} + I_{54}) \geq 0.60 \quad (1)$$

Here, in Formula (1), in units of cps, an X-ray diffraction intensity of {411} and {330} is substituted for $I_{18}$, an X-ray
(Continued)

diffraction intensity of {442} and {600} is substituted for $I_{36}$, and an X-ray diffraction intensity of {552} is substituted for $I_{54}$.

4 Claims, 7 Drawing Sheets

(51) Int. Cl.
*C25D 5/48* (2006.01)
*C25D 7/04* (2006.01)
*E21B 17/042* (2006.01)

OIL-WELL METAL PIPE

TECHNICAL FIELD

The present disclosure relates to an oil-well metal pipe, and more particularly relates to an oil-well metal pipe with a threaded connection formed.

BACKGROUND ART

An oil-well metal pipe is used for drilling in oil fields and natural gas fields (hereinafter, oil fields and natural gas fields are collectively referred to as "oil wells"). Specifically, at the oil well drilling site, in accordance with the depth of the oil well, a plurality of oil-well metal pipes are connected to form an oil country tubular goods connected body as typified by a casing pipe or a tubing pipe. An oil country tubular goods connected body is formed by fastening threaded connections formed at the end portion of oil-well steel pipe to each other. Inspections may in some cases be conducted on oil country tubular goods connected bodies. When conducting an inspection, the oil country tubular goods connected body is lifted up and the threaded connection is loosened. Oil-well metal pipes that are loosened and detached from the oil country tubular goods connected body are then inspected. After the inspection, the threaded connections of oil-well metal pipes are refastened and reused as a part of the oil country tubular goods connected body.

An oil-well metal pipe includes a pipe main body which includes a first end portion and a second end portion. The pipe main body includes a pin that is formed at the first end portion, and a box that is formed at the second end portion. The pin has a pin contact surface including an external thread part on an outer peripheral surface of the first end portion of the pipe main body. The box has a box contact surface including an internal thread part on an inner peripheral surface of an end portion (second end portion) of the pipe main body that is on the opposite side to the pin. When threaded connections formed at the end portion of oil-well metal pipes are fastened together, the pin contact surface comes in contact with the box contact surface.

The pin contact surface and the box contact surface repeatedly experience strong friction during fastening and loosening of the oil-well metal pipe. Unless there is sufficient durability with respect to friction at these regions, galling (uncorrectable seizure) will occur during repeated fastening and loosening. Accordingly, an oil-well metal pipe is required to have sufficient durability with respect to friction, that is, to have excellent galling resistance.

Heretofore, heavy metal-containing compound greases, which are referred to as "dopes", have been used to improve the galling resistance. Application of a compound grease to the pin contact surface and/or the box contact surface can improve the galling resistance of an oil-well metal pipe. However, heavy metals contained in compound greases, such as Pb, Zn, and Cu, may affect the environment. For this reason, the development of an oil-well metal pipe that is excellent in galling resistance without the use of a compound grease is desired.

In an oil-well metal pipe disclosed in Patent Literature 1 (International Application Publication No. WO2016/170031), a Zn—Ni alloy plating layer is formed on a pin contact surface or a box contact surface instead of using a compound grease. The Zn contained in the Zn—Ni alloy plating layer formed on a contact surface of the oil-well metal pipe enhances the corrosion resistance of the oil-well metal pipe by sacrificial protection. In addition, it is disclosed in Patent Literature 1 that the Zn—Ni alloy is also excellent in a wear resistance characteristic.

CITATION LIST

Patent Literature

Patent Literature 1: International Application Publication No. WO2016/170031

SUMMARY OF INVENTION

Technical Problem

In this connection, the Zn—Ni alloy plating layer also repeatedly experiences strong friction during fastening and loosening of the oil-well metal pipe. If a part of a Zn—Ni alloy plating layer that repeatedly experienced strong friction peels off, the coefficient of friction of the contact surface will increase all at once and the galling resistance of the oil-well metal pipe will rapidly decrease. Therefore, it is preferable that it is difficult for a Zn—Ni alloy plating layer formed on a contact surface of an oil-well metal pipe to peel off even if the Zn—Ni alloy plating layer repeatedly experiences strong friction. Hereinafter, in the present description, a fact that it is difficult for a Zn—Ni alloy plating layer to peel off even when the Zn—Ni alloy plating layer repeatedly experiences strong friction is also referred to as "adhesion is high".

According to the technology disclosed in the aforementioned Patent Literature 1, the galling resistance of an oil-well metal pipe can be increased by forming a Zn—Ni alloy plating layer on a pin contact surface or a box contact surface. However, in the aforementioned Patent Literature 1, the adhesion of a Zn—Ni alloy plating layer formed on a contact surface of an oil-well metal pipe is not investigated.

An objective of the present disclosure is to provide an oil-well metal pipe that includes a Zn—Ni alloy plating layer which has high adhesion.

Solution to Problem

An oil-well metal pipe, including:
a pipe main body including a first end portion and a second end portion,
wherein
the pipe main body includes:
a pin formed at the first end portion; and
a box formed at the second end portion,
the pin includes:
a pin contact surface including an external thread part, and
the box includes:
a box contact surface including an internal thread part,
the oil-well metal pipe further including:
a Zn—Ni alloy plating layer formed on at least one of the pin contact surface and the box contact surface,
wherein X-ray diffraction intensities of the Zn—Ni alloy plating layer satisfy Formula (1):

$$I_{18}/(I_{18} + I_{36} + I_{54}) \geq 0.60 \tag{1}$$

where, an X-ray diffraction intensity of {411} and {330} such that a sum of squares of the Miller indices becomes 18 is substituted, in units of cps, for $I_{18}$ in Formula (1); an X-ray diffraction intensity of {442} and {600} such that a sum of squares of the Miller indices becomes 36 is substituted, in units of cps, for $I_{36}$ in Formula (1); and an X-ray diffraction intensity of {552} such that a sum of squares of the Miller indices becomes 54 is substituted, in units of cps, for $I_{54}$ in Formula (1).

Advantageous Effects of Invention

The Zn—Ni alloy plating layer of the oil-well metal pipe according to the present disclosure has high adhesion.

DESCRIPTION OF EMBODIMENTS

Figure 1:
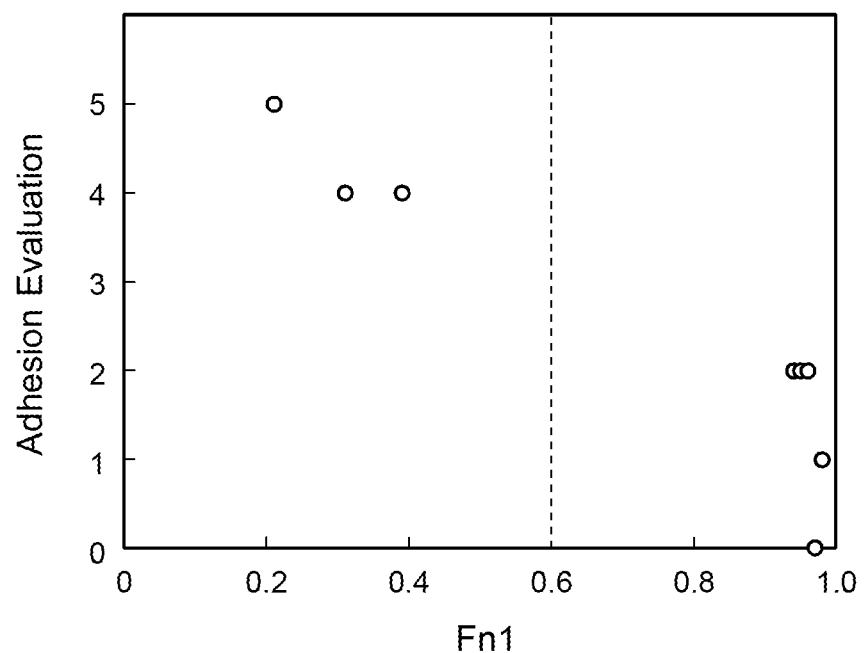
FIG. 1 is a view illustrating the relation between Fn1 (=$I_{18}/(I_{18}+I_{36}+I_{54})$) and an adhesion evaluation which is an index of adhesion in the examples of the present disclosure.

The present embodiment is described in detail below with reference to the accompanying drawings. The same reference symbols will be used throughout the drawings to refer to the same or like parts, and description thereof will not be repeated.

The present inventors conducted detailed investigations regarding means for increasing the adhesion of a Zn—Ni alloy plating layer that is formed on at least one of a pin contact surface and a box contact surface of an oil-well metal pipe. As a result, the present inventors obtained the following findings.

The physical and chemical properties of a metal material are influenced by the crystallographic structure of the material and the fine structure as typified by the surface morphology. Therefore, the present inventors focused their attention on the microstructure of a Zn—Ni alloy plating layer that is a metal material, and conducted detailed investigations regarding means for increasing the adhesion of the Zn—Ni alloy plating layer. As a result, the present inventors found that the adhesion varies depending on the crystal orientations in the Zn—Ni alloy plating layer. In the present description, the distribution state of the crystal orientations in a Zn—Ni alloy plating layer is also referred to as "orientation of a Zn—Ni alloy plating layer". That is, the present inventors considered that if the orientation of a Zn—Ni alloy plating layer can be appropriately controlled, there is a possibility that the adhesion of the Zn—Ni alloy plating layer can be increased.

In this regard, X-ray diffraction analysis (XRD) is available as a technique for evaluating the orientation of a metal material. In XRD, diffraction that occurs as a result of scattering and interference of X-rays caused by electrons surrounding atoms is analyzed. Therefore, in XRD, a distinctive diffraction pattern is obtained for each atomic arrangement in the material. In other words, the size of crystals and the orientation of a material can be evaluated based on a diffraction pattern obtained by XRD.

Therefore, the present inventors produced various oil-well metal pipes which had a Zn—Ni alloy plating layer formed on a contact surface, and evaluated the orientation of each Zn—Ni alloy plating layer by XRD and investigated the relation between the orientation of the Zn—Ni alloy plating layer and adhesion. As a result, it was revealed that if the X-ray diffraction intensities of a Zn—Ni alloy plating layer satisfy the following Formula (1), the adhesion of the Zn—Ni alloy plating layer markedly increases.

$$I_{18}/(I_{18} + I_{36} + I_{54}) \geq 0.60 \quad (1)$$

Here, an X-ray diffraction intensity of {411} and {330} such that a sum of squares of the Miller indices becomes 18 is substituted, in units of cps, for $I_{18}$ in Formula (1); an X-ray diffraction intensity of {442} and {600} such that a sum of squares of the Miller indices becomes 36 is substituted, in units of cps, for $I_{36}$ in Formula (1); and an X-ray diffraction intensity of {552} such that a sum of squares of the Miller indices becomes 54 is substituted, in units of cps, for $I_{54}$ in Formula (1).

It is defined that Fn1=$I_{18}/(I_{18}+I_{36}+I_{54})$. Fn1 is an index that indicates the orientation tendency of {411} and {330}. That is, the larger the value of Fn1 is, the more Fn1 indicates that {411} and {330} are aligned in the same direction. As a result of additional detailed studies conducted by the present inventors, it was revealed that when Fn1 is 0.60 or more, the adhesion of the Zn—Ni alloy plating layer markedly increases. This will now be described specifically using the drawings.

FIG. 1 is a view illustrating the relation between Fn1 (=$I_{18}/(I_{18}+I_{36}+I_{54})$) and an adhesion evaluation which is an index of adhesion in the examples of the present disclosure. FIG. 1 was created using examples which are described later. An X-ray diffraction intensity for determining Fn1, and the adhesion evaluation were determined by methods which are described later. Note that, with regard to the adhesion evaluation, the evaluation result is "0" in the case of the least amount of peeling, and is "5" in the case of the largest amount of peeling.

Referring to FIG. 1, when Fn1 is 0.60 or more, the adhesion evaluation sharply decreases. That is, if Fn1 is 0.60 or more, the adhesion of the Zn—Ni alloy plating layer markedly increases. Therefore, according to the oil-well metal pipe of the present embodiment, in a Zn—Ni alloy plating layer that is formed on a contact surface, Fn1 is made 0.60 or more.

Note that, the reason why adhesion of a Zn—Ni alloy plating layer increases in a case where Fn1 is made 0.60 or more has not been clarified in detail. However, the present inventors surmise that the reason is as follows. As described above, the physical and chemical properties of a metal material are influenced by the crystallographic structure of the material. In other words, if the orientations of Zn—Ni alloy plating layers differ, there is a possibility that the ease with which strain in the crystal lattice remains will also vary. In this regard, in a case where {411} and {330} are aligned in the same direction, there is a possibility that it will be difficult for strain to remain. Consequently, the present inventors consider that if Fn1 is increased to 0.60 or more, residual tensile stress in the Zn—Ni alloy plating layer can be reduced and the adhesion is increased.

The present inventors surmise that the adhesion of a Zn—Ni alloy plating layer in which Fn1 is made 0.60 or more is increased by the above mechanism. Note that, there is also a possibility that the adhesion of a Zn—Ni alloy plating layer in which Fn1 is made 0.60 or more is increased by a mechanism that is different to the mechanism described above. However, the fact that the adhesion of a Zn—Ni alloy plating layer is increased by making Fn1 0.60 or more has been demonstrated by examples which are described later.

The gist of the oil-well metal pipe according to the present embodiment which was completed based on the above findings is as follows.

[1]

An oil-well metal pipe, including:
a pipe main body including a first end portion and a second end portion,
wherein
the pipe main body includes:
a pin formed at the first end portion; and
a box formed at the second end portion,
the pin includes:
a pin contact surface including an external thread part, and
the box includes:
a box contact surface including an internal thread part,
the oil-well metal pipe further including:
a Zn—Ni alloy plating layer formed on at least one of the pin contact surface and the box contact surface,
wherein X-ray diffraction intensities of the Zn—Ni alloy plating layer satisfy Formula (1):

$$I_{18}/(I_{18} + I_{36} + I_{54}) \geq 0.60 \quad (1)$$

where, an X-ray diffraction intensity of {411} and {330} such that a sum of squares of the Miller indices becomes 18 is substituted, in units of cps, for $I_{18}$ in Formula (1); an X-ray diffraction intensity of {442} and {600} such that a sum of squares of the Miller indices becomes 36 is substituted, in units of cps, for $I_{36}$ in Formula (1); and an X-ray diffraction intensity of {552} such that a sum of squares of the Miller indices becomes 54 is substituted, in units of cps, for $I_{54}$ in Formula (1).

[2]

The oil-well metal pipe according to [1], wherein
a thickness of the Zn—Ni alloy plating layer is within a range of 5 to 25 μm.

[3]

The oil-well metal pipe according to [1] or [2], including:
a lubricant coating on or above the Zn—Ni alloy plating layer.

Hereunder, the oil-well metal pipe according to the present embodiment is described in detail.

Structure of Oil-Well Metal Pipe

First, the structure of the oil-well metal pipe according to the present embodiment will be described. The oil-well metal pipe has a well-known structure. The available types of oil-well metal pipe are a T&C type oil-well metal pipe and an integral type oil-well metal pipe. Hereunder, each type of oil-well metal pipe is described in detail.

Case Where Oil-Well Metal Pipe is T&C Type

Figure 2:
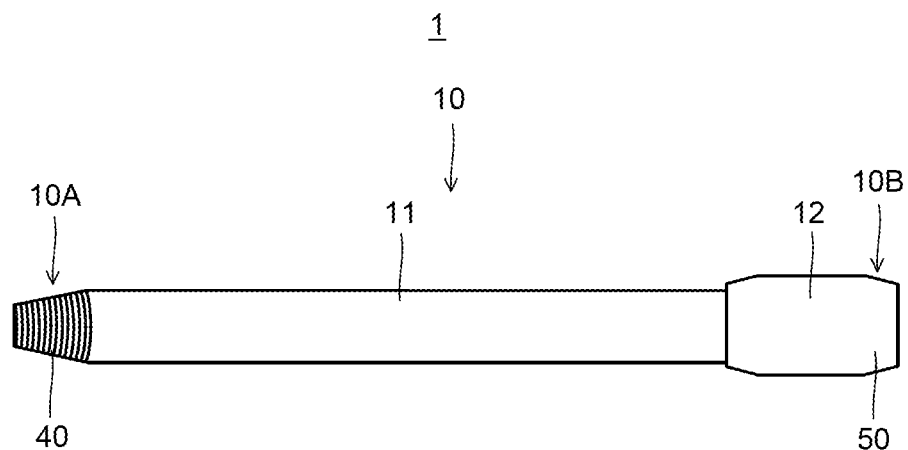
FIG. 2 is a configuration diagram illustrating one example of an oil-well metal pipe according to the present embodiment.

FIG. 2 is a configuration diagram illustrating one example of an oil-well metal pipe 1 according to the present embodiment. FIG. 2 is a configuration diagram illustrating the oil-well metal pipe 1 of a so-called "T&C (threaded and coupled) type". Referring to FIG. 2, the oil-well metal pipe 1 includes a pipe main body 10.

The pipe main body 10 extends in the pipe axis direction. A cross section perpendicular to the pipe axis direction of the pipe main body 10 is a circular shape. The pipe main body 10 includes a first end portion 10A and a second end portion 10B. The first end portion 10A is an end portion on the opposite side to the second end portion 10B. In the T&C type oil-well metal pipe 1 illustrated in FIG. 2, the pipe main body 10 includes a pin tube body 11 and a coupling 12. The coupling 12 is attached to one end of the pin tube body 11. More specifically, the coupling 12 is fastened by threading to one end of the pin tube body 11.

Figure 3:
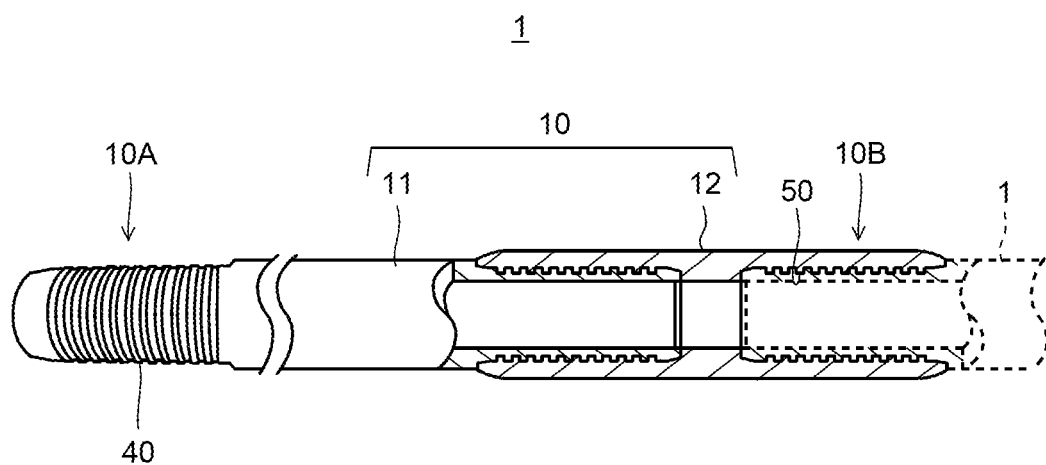
FIG. 3 is a partial cross-sectional view illustrating a cross section (longitudinal cross section) along a pipe axis direction of a coupling of the oil-well metal pipe illustrated in FIG. 2.

FIG. 3 is a partial cross-sectional view illustrating a cross section (longitudinal cross section) that is parallel to the pipe axis direction of the coupling 12 of the oil-well metal pipe 1 illustrated in FIG. 2. Referring to FIG. 2 and FIG. 3, the pipe main body 10 includes a pin 40 and a box 50. The pin 40 is formed at the first end portion 10A of the pipe main body 10. When performing fastening, the pin 40 is inserted into the box 50 of another oil-well metal pipe (not illustrated), and is fastened by threading to the box 50 of the other oil-well metal pipe 1.

The box 50 is formed at the second end portion 10B of the pipe main body 10. When performing fastening, the pin 40 of another oil-well metal pipe 1 is inserted into the box 50, and the box 50 is fastened by threading to the pin 40 of the other oil-well metal pipe 1.

Regarding Structure of Pin

Figure 4:
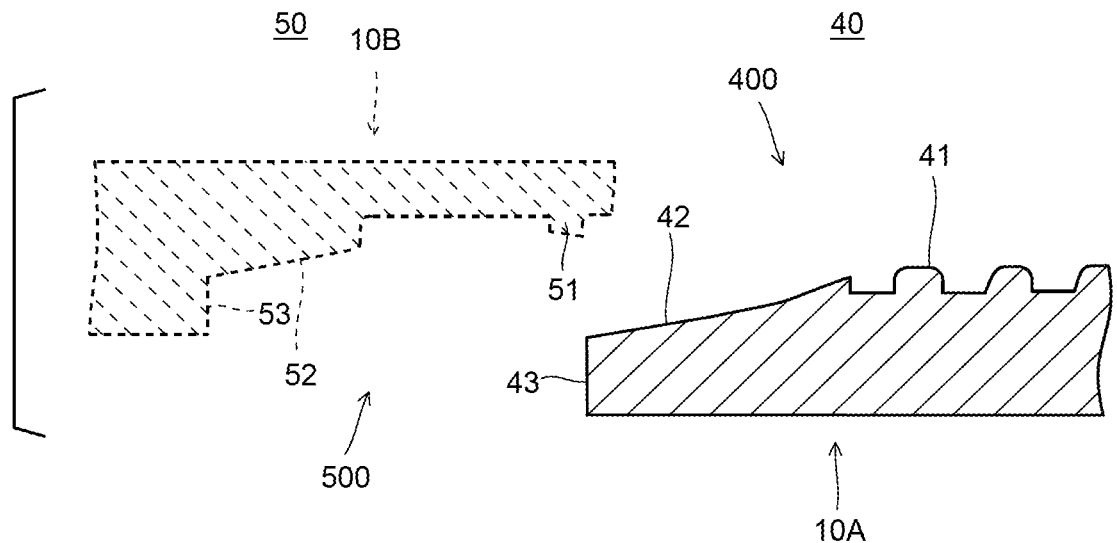
FIG. 4 is a cross-sectional view parallel to the pipe axis direction of the oil-well metal pipe illustrated in FIG. 3, that illustrates a portion in the vicinity of a pin of the oil-well metal pipe.

FIG. 4 is a cross-sectional view of a portion in the vicinity of the pin 40 of the oil-well metal pipe 1 illustrated in FIG. 3, that is a cross-sectional view parallel to the pipe axis direction of the oil-well metal pipe 1. A dashed line portion in FIG. 4 represents the structure of the box 50 of another oil-well metal pipe in the case of fastening the oil-well metal pipe 1 to another oil-well metal pipe 1. Referring to FIG. 4, the pin 40 includes a pin contact surface 400 on the outer peripheral surface of the first end portion 10A of the pipe main body 10. The pin contact surface 400 contacts the box 50 of the other oil-well metal pipe 1 when performing fastening to the other oil-well metal pipe 1.

The pin contact surface 400 includes at least an external thread part 41 formed in the outer peripheral surface of the first end portion 10A. The pin contact surface 400 may further include a pin sealing surface 42 and a pin shoulder surface 43. In FIG. 4, on the outer peripheral surface of the first end portion 10A, the pin sealing surface 42 is disposed further on the front end side of the first end portion 10A than the external thread part 41. In other words, the pin sealing surface 42 is disposed between the external thread part 41 and the pin shoulder surface 43. The pin sealing surface 42 is provided in a tapered shape. Specifically, the external diameter of the pin sealing surface 42 gradually decreases from the external thread part 41 toward the pin shoulder surface 43 in the longitudinal direction (pipe axis direction) of the first end portion 10A.

When performing fastening with another oil-well metal pipe 1, the pin sealing surface 42 contacts a box sealing surface 52 (described later) of the box 50 of the other oil-well metal pipe 1. More specifically, during fastening, when the pin 40 is inserted into the box 50 of the other oil-well metal pipe 1, the pin sealing surface 42 contacts the box sealing surface 52. Subsequently, when the pin 40 is screwed further into the box 50 of the other oil-well metal pipe 1, the pin sealing surface 42 closely contacts the box sealing surface 52. By this means, during fastening, the pin sealing surface 42 closely contacts the box sealing surface 52 to thereby form a seal that is based on metal-to-metal contact. Therefore, the gastightness can be increased in each of the oil-well metal pipes 1 that are fastened to each other.

In FIG. 4, the pin shoulder surface 43 is disposed at the front end face of the first end portion 10A. In other words, in the pin 40 illustrated in FIG. 4, the external thread part 41, the pin sealing surface 42 and the pin shoulder surface 43 are disposed sequentially in that order from the center of the pipe main body 10 toward the first end portion 10A. During fastening to another oil-well metal pipe 1, the pin shoulder surface 43 opposes and contacts a box shoulder surface 53 (described later) of the box 50 of the other oil-well metal pipe 1. More specifically, during fastening, the pin shoulder surface 43 contacts the box shoulder surface 53 as a result of the pin 40 being inserted into the box 50 of the other oil-well metal pipe 1. By this means, during fastening, a high torque can be obtained. Further, the positional relation between the pin 40 and the box 50 in the fastening state can be stabilized.

Note that, the pin contact surface 400 of the pin 40 includes at least the external thread part 41. In other words, the pin contact surface 400 may include the external thread part 41, and need not include the pin sealing surface 42 and the pin shoulder surface 43. The pin contact surface 400 may include the external thread part 41 and the pin shoulder surface 43, and need not include the pin sealing surface 42. The pin contact surface 400 may include the external thread part 41 and the pin sealing surface 42, and need not include the pin shoulder surface 43.

Regarding Structure of Box

Figure 5:
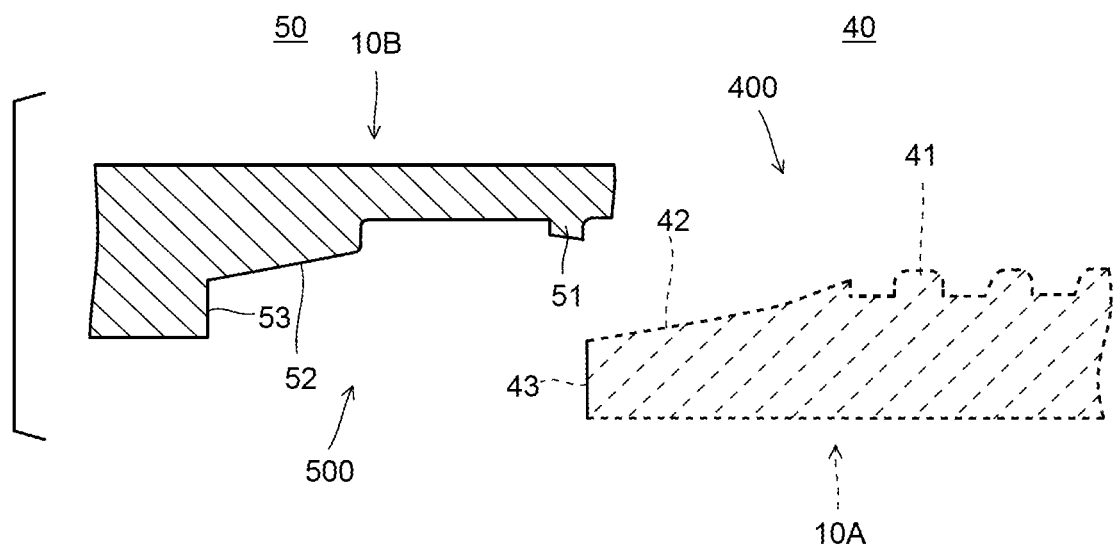
FIG. 5 is a cross-sectional view parallel to the pipe axis direction of the oil-well metal pipe illustrated in FIG. 3, that illustrates a portion in the vicinity of a box of the oil-well metal pipe.

FIG. 5 is a cross-sectional view of a portion in the vicinity of the box 50 of the oil-well metal pipe 1 illustrated in FIG. 3, that is a cross-sectional view parallel to the pipe axis direction of the oil-well metal pipe 1. A dashed line portion in FIG. 5 represents the structure of the pin 40 of another oil-well metal pipe 1 in the case of fastening the oil-well metal pipe 1 to another oil-well metal pipe 1. Referring to FIG. 5, the box 50 includes a box contact surface 500 on the inner peripheral surface of the second end portion 10B of the pipe main body 10. When performing fastening to another oil-well metal pipe 1, the box contact surface 500 contacts the pin contact surface 400 of the pin 40 of the other oil-well metal pipe 1 when the pin 40 is screwed into the box 50.

The box contact surface 500 includes at least an internal thread part 51 formed in the inner peripheral surface of the second end portion 10B. When performing fastening, the internal thread part 51 engages with the external thread part 41 of the pin 40 of the other oil-well metal pipe 1.

The box contact surface 500 may further include the box sealing surface 52 and the box shoulder surface 53. In FIG. 5, on the inner peripheral surface of the second end portion 10B, the box sealing surface 52 is disposed further on the pipe main body 10 side than the internal thread part 51. In other words, the box sealing surface 52 is disposed between the internal thread part 51 and the box shoulder surface 53. The box sealing surface 52 is provided in a tapered shape. Specifically, the internal diameter of the box sealing surface 52 gradually decreases from the internal thread part 51 toward the box shoulder surface 53 in the longitudinal direction (pipe axis direction) of the second end portion 10B.

When performing fastening to another oil-well metal pipe 1, the box sealing surface 52 contacts the pin sealing surface 42 of the pin 40 of the other oil-well metal pipe 1. More specifically, during fastening, when the pin 40 of the other oil-well metal pipe 1 is screwed into the box 50, the box sealing surface 52 contacts the pin sealing surface 42, and when the pin 40 is screwed in further, the box sealing surface 52 closely contacts the pin sealing surface 42. By this means, during fastening, the box sealing surface 52 closely contacts the pin sealing surface 42 to thereby form a seal that is based on metal-to-metal contact. Therefore, the gastightness can be increased in each of the oil-well metal pipes 1 that are fastened to each other.

The box shoulder surface 53 is disposed further on the pipe main body 10 side than the box sealing surface 52. In other words, in the box 50, the box shoulder surface 53, the box sealing surface 52 and the internal thread part 51 are disposed sequentially in that order from the center of the pipe main body 10 toward the front end of the second end portion 10B. When performing fastening to another oil-well metal pipe 1, the box shoulder surface 53 opposes and contacts the pin shoulder surface 43 of the pin 40 of the other oil-well metal pipe 1. More specifically, during fastening, the box shoulder surface 53 contacts the pin shoulder surface 43 as a result of the pin 40 of the other oil-well metal pipe 1 being inserted into the box 50. By this means, during fastening, a high torque can be obtained. Further, the positional relation between the pin 40 and the box 50 in the fastening state can be stabilized.

The box contact surface 500 includes at least the internal thread part 51. When performing fastening, the internal thread part 51 of the box contact surface 500 of the box 50 contacts the external thread part 41 of the pin contact surface 400 of the pin 40 in a manner such that the internal thread part 51 corresponds with the external thread part 41. The box sealing surface 52 contacts the pin sealing surface 42 in a manner such that the box sealing surface 52 corresponds with the pin sealing surface 42. The box shoulder surface 53 contacts the pin shoulder surface 43 in a manner such that the box shoulder surface 53 corresponds with the pin shoulder surface 43.

In a case where the pin contact surface 400 includes the external thread part 41 and does not include the pin sealing surface 42 and the pin shoulder surface 43, the box contact surface 500 includes the internal thread part 51 and does not include the box sealing surface 52 and the box shoulder surface 53. In a case where the pin contact surface 400 includes the external thread part 41 and the pin shoulder surface 43 and does not include the pin sealing surface 42, the box contact surface 500 includes the internal thread part 51 and the box shoulder surface 53 and does not include the box sealing surface 52. In a case where the pin contact surface 400 includes the external thread part 41 and the pin sealing surface 42 and does not include the pin shoulder surface 43, the box contact surface 500 includes the internal thread part 51 and the box sealing surface 52 and does not include the box shoulder surface 53.

The pin contact surface 400 may include a plurality of the external thread parts 41, may include a plurality of the pin sealing surfaces 42, and may include a plurality of the pin shoulder surfaces 43. For example, the pin shoulder surface 43, the pin sealing surface 42, the external thread part 41, the pin sealing surface 42, the pin shoulder surface 43, the pin sealing surface 42 and the external thread part 41 may be disposed in that order on the pin contact surface 400 of the pin 40 from the front end of the first end portion 10A toward the center of the pipe main body 10. In such case, the internal thread part 51, the box sealing surface 52, the box shoulder surface 53, the box sealing surface 52, the internal thread part 51, the box sealing surface 52 and the box shoulder surface 53 are disposed in that order on the box contact surface 500 of the box 50 from the front end of the second end portion 10B toward the center of the pipe main body 10.

Figure 6:
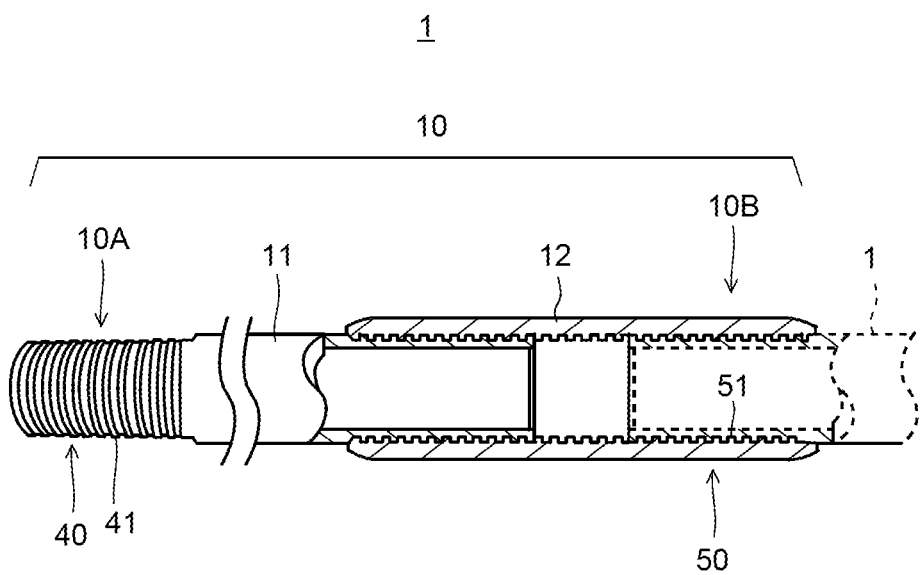
FIG. 6 is a partial cross-sectional view illustrating a cross section (longitudinal cross section) along a pipe axis direction of a coupling of the oil-well metal pipe according to the present embodiment, that is different from FIG. 3.

In FIG. 4 and FIG. 5, a so-called "premium joint" is illustrated in which the pin 40 includes the external thread part 41, the pin sealing surface 42 and the pin shoulder surface 43, and the box 50 includes the internal thread part 51, the box sealing surface 52 and the box shoulder surface 53. However, as described above, the pin 40 may include the external thread part 41 and need not include the pin sealing surface 42 and the pin shoulder surface 43. In this case, the box 50 includes the internal thread part 51 and does not include the box sealing surface 52 and the box shoulder surface 53. FIG. 6 is a view illustrating one example of the oil-well metal pipe 1 in which the pin 40 includes the external thread part 41 and does not include the pin sealing surface and the pin shoulder surface, and the box 50 includes the internal thread part 51 and does not include the box sealing surface and the box shoulder surface. The oil-well metal pipe 1 according to the present embodiment may have the structure illustrated in FIG. 6.

Case where Oil-Well Metal Pipe is Integral Type

The oil-well metal pipe 1 illustrated in FIG. 2, FIG. 3 and FIG. 6 is a so-called "T&C type" oil-well metal pipe 1, in which the pipe main body 10 includes the pin tube body 11 and the coupling 12. However, the oil-well metal pipe 1 according to the present embodiment may be an integral type instead of a T&C type.

Figure 7:
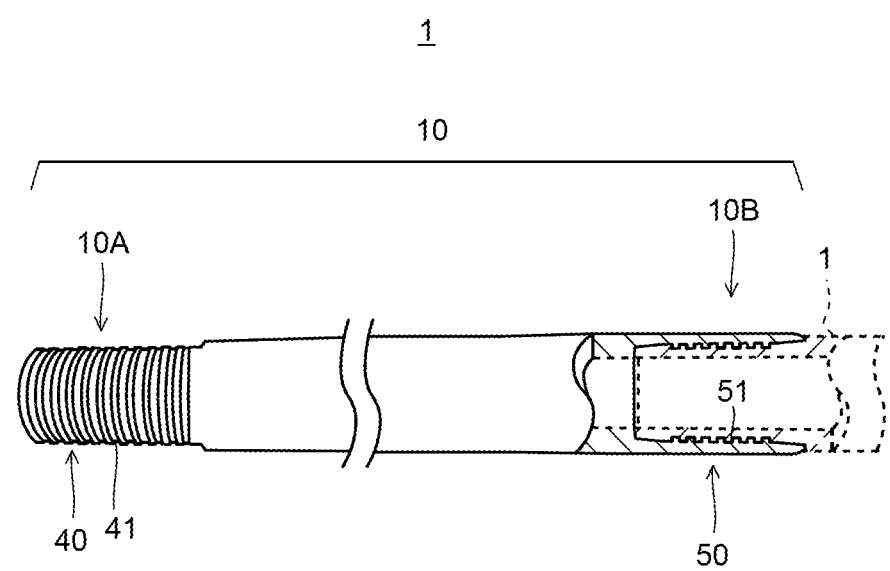
FIG. 7 is a configuration diagram illustrating an integral type oil-well metal pipe according to the present embodiment.

FIG. 7 is a configuration diagram of an integral type oil-well metal pipe 1 according to the present embodiment. Referring to FIG. 7, the integral type oil-well metal pipe 1 includes a pipe main body 10. The pipe main body 10 includes a first end portion 10A and a second end portion 10B. The first end portion 10A is disposed on the opposite side to the second end portion 10B. As described above, in the T&C type oil-well metal pipe 1, the pipe main body 10 includes the pin tube body 11 and the coupling 12. In other words, in the T&C type oil-well metal pipe 1, the pipe main body 10 is constituted by fastening two separate members (the pin tube body 11 and the coupling 12). In contrast, in the integral type oil-well metal pipe 1, the pipe main body 10 is formed in an integral manner.

The pin 40 is formed at the first end portion 10A of the pipe main body 10. When performing fastening, the pin 40 is inserted in and screwed into the box 50 of another integral type oil-well metal pipe 1, and thereby fastened to the box 50 of the other integral type oil-well metal pipe 1. The box 50 is formed at the second end portion 10B of the pipe main body 10. When performing fastening, the pin 40 of another integral type oil-well metal pipe 1 is inserted in and screwed into the box 50, to thereby fasten the box 50 to the pin 40 of the other integral type oil-well metal pipe 1.

The structure of the pin 40 of the integral type oil-well metal pipe 1 is the same as the structure of the pin 40 of the T&C type oil-well metal pipe 1 illustrated in FIG. 4. Similarly, the structure of the box 50 of the integral type oil-well metal pipe 1 is the same as the structure of the box 50 of the T&C type oil-well metal pipe 1 illustrated in FIG. 5. Note that, in FIG. 7, the pin shoulder surface, the pin sealing surface and the external thread part 41 in the pin 40 are disposed in that order from the front end of the first end portion 10A toward the center of the pipe main body 10. Therefore, the internal thread part 51, the box sealing surface and the box shoulder surface in the box 50 are disposed in that order from the front end of the second end portion 10B toward the center of the pipe main body 10. However, similarly to FIG. 4, it suffices that the pin contact surface 400 of the pin 40 of the integral type oil-well metal pipe 1 includes at least the external thread part 41. Further, similarly to FIG. 5, it suffices that the box contact surface 500 of the box 50 of the integral type oil-well metal pipe 1 includes at least the internal thread part 51.

In short, the oil-well metal pipe 1 according to the present embodiment may be a T&C type or may be an integral type.

Regarding Chemical Composition of Pipe Main Body

In the oil-well metal pipe 1 according to the present embodiment, the chemical composition of the pipe main body 10 is not particularly limited. The pipe main body 10 may have a chemical composition corresponding to carbon steel, or may have a chemical composition corresponding to stainless steel.

Regarding Zn—Ni Alloy Plating Layer

In the oil-well metal pipe 1 according to the present embodiment, a Zn—Ni alloy plating layer is formed on at least one contact surface of the pin contact surface 400 and the box contact surface 500. In other words, the Zn—Ni alloy plating layer may be formed on the pin contact surface 400, and need not be formed on the box contact surface 500. Alternatively, the Zn—Ni alloy plating layer may be formed on the box contact surface 500, and need not be formed on the pin contact surface 400. Further, the Zn—Ni alloy plating layer may be formed on the pin contact surface 400 and on the box contact surface 500.

In the following description, the structure on the pin contact surface 400 in a case where the Zn—Ni alloy plating layer is formed on the pin contact surface 400, and the structure on the box contact surface 500 in a case where the Zn—Ni alloy plating layer is formed on the box contact surface 500 are described.

Figure 8:
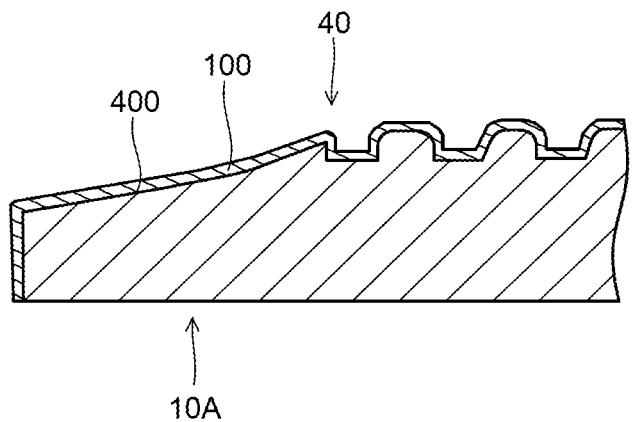
FIG. 8 is an enlarged view of a pin contact surface illustrated in FIG. 4.

Structure on Pin Contact Surface in Case where Zn—Ni Alloy Plating Layer is Formed on Pin Contact Surface FIG. 8 is a cross-sectional view of the vicinity of the pin contact surface 400 in a case where the Zn—Ni alloy plating layer 100 is formed on the pin contact surface 400. Referring to FIG. 8, the oil-well metal pipe 1 further includes the Zn—Ni alloy plating layer 100 formed on the pin contact surface 400 of the pin 40.

The Zn—Ni alloy plating layer 100 may be formed on one part of the pin contact surface 400 or may be formed on the entire pin contact surface 400. The interfacial pressure increases, in particular, in the final stage of fastening at the pin sealing surface 42. Therefore, in a case where the Zn—Ni alloy plating layer 100 is partially formed on the pin contact surface 400, the Zn—Ni alloy plating layer 100 is preferably formed on at least the pin sealing surface 42. As mentioned above, the Zn—Ni alloy plating layer 100 may be formed on the entire pin contact surface 400.

Figure 9:
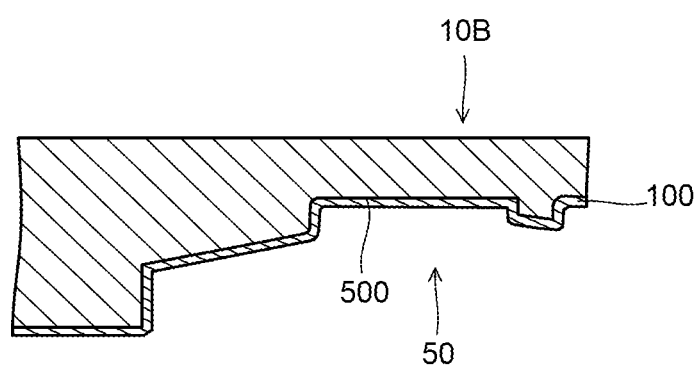
FIG. 9 is an enlarged view of a box contact surface illustrated in FIG. 5.

Structure on Box Contact Surface in Case Where Zn—Ni Alloy Plating Layer is Formed on Box Contact Surface FIG. 9 is a cross-sectional view of the vicinity of the box contact surface 500 in a case where the Zn—Ni alloy plating layer 100 is formed on the box contact surface 500. Referring to FIG. 9, in this case, the Zn—Ni alloy plating layer 100 is formed on the box contact surface 500. The Zn—Ni alloy plating layer 100 may be formed on one part of the box contact surface 500 or may be formed on the entire box contact surface 500. The interfacial pressure increases, in particular, in the final stage of fastening at the box sealing surface 52. Therefore, in a case where the Zn—Ni alloy plating layer 100 is partially formed on the box contact surface 500, the Zn—Ni alloy plating layer 100 is preferably formed on at least the box sealing surface 52.

Regarding Composition of Zn—Ni Alloy Plating Layer

As described above, the Zn—Ni alloy plating layer 100 is formed on at least one contact surface among the pin contact surface 400 and the box contact surface 500. Here, the Zn—Ni alloy plating layer 100 is composed of a Zn—Ni alloy. Specifically, the Zn—Ni alloy contains zinc (Zn) and nickel (Ni). In some cases the Zn—Ni alloy also contains impurities. Here, the term "impurities" of the Zn—Ni alloy refers to substances other than Zn and Ni that are contained in the Zn—Ni alloy plating layer 100 during production and the like of the oil-well metal pipe 1, and whose contents are within a range that does not influence the effects of the present embodiment.

Here, the Zn—Ni alloy plating layer 100 contains Zn. Zn is a base metal in comparison to Fe. Therefore, the Zn—Ni alloy plating layer 100 is corroded with priority relative to the steel material (sacrificial protection). By this means, the corrosion resistance property of the oil-well metal pipe 1 is improved.

The chemical composition of the Zn—Ni alloy plating layer 100 can be measured by the following method. A sample including the Zn—Ni alloy plating layer 100 (sample including a contact surface on which the Zn—Ni alloy plating layer 100 is formed) is taken from the oil-well metal pipe 1. The Zn—Ni alloy plating layer 100 of the obtained sample is dissolved in hydrochloric acid at 10% concentration to obtain a liquid solution. The obtained liquid solution is subjected to elemental analysis by Inductively Coupled Plasma Atomic Emission Spectrometry (ICP-AES), and the Ni content (mass %) and Zn content (mass %) in the Zn—Ni alloy plating layer 100 are determined.

Thickness of Zn—Ni Alloy Plating Layer 100

The thickness of the Zn—Ni alloy plating layer 100 is not particularly limited. The thickness of the Zn—Ni alloy plating layer 100 is, for example, 1 to 20 μm. If the thickness of the Zn—Ni alloy plating layer 100 is 1 μm or more, the galling resistance can be further improved. Even if the thickness of the Zn—Ni alloy plating layer 100 is more than 20 μm, the aforementioned effects will be saturated. The lower limit of the thickness of the Zn—Ni alloy plating layer 100 is preferably 3 μm, and more preferably is 5 μm. The upper limit of the thickness of the Zn—Ni alloy plating layer 100 is preferably 18 μm, and more preferably is 15 μm.

The thickness of the Zn—Ni alloy plating layer 100 in the present embodiment can be measured by the following method. The thickness of the Zn—Ni alloy plating layer 100 is measured at an arbitrary four locations on the pin contact surface 400 or the box contact surface 500 on which the Zn—Ni alloy plating layer 100 is formed, using an eddy current phase-type coating thickness gauge PHASCOPE PMP10 manufactured by Helmut Fischer GmbH. The measurement is performed by a method conforming to ISO (International Organization for Standardization) 21968 (2005). The measurement locations are four locations (four locations at 0°, 90°, 180° and 270°) in the pipe circumferential direction of the oil-well metal pipe 1. The arithmetic mean value of the measurement results is taken as the thickness of the Zn—Ni alloy plating layer 100.

Microstructure of Zn—Ni Alloy Plating Layer 100

The Zn—Ni alloy plating layer 100 includes a γ phase. In this regard, an η phase, γ phase and α phase are included in a Zn—Ni alloy formed by an electroplating process. The η phase is a phase with the chemical formula Zn that has a hexagonal crystal structure. The γ phase is a phase with the chemical formula $Ni_5Zn_{21}$ that has a body-centered cubic crystal structure. The α phase is a phase with the chemical formula Ni that has a face-centered cubic crystal structure. The Zn—Ni alloy plating layer 100 according to the present embodiment may be a mixed phase of η phase, γ phase and α phase. Preferably the Zn—Ni alloy plating layer 100 is made a γ monophase. In the present description, the term "γ monophase" means that phases other than the γ phase (that is, the η phase and α phase) are small enough to be negligible.

Orientation of Zn—Ni Alloy Plating Layer 100

The X-ray diffraction intensities of the Zn—Ni alloy plating layer 100 of the present embodiment satisfies the following Formula (1).

$$I_{18}/(I_{18}+I_{36}+I_{54}) \geq 0.60 \quad (1)$$

Here, an X-ray diffraction intensity of {411} and {330} such that a sum of squares of the Miller indices becomes 18 is substituted, in units of cps, for $I_{18}$ in Formula (1); an X-ray diffraction intensity of {442} and {600} such that a sum of squares of the Miller indices becomes 36 is substituted, in units of cps, for $I_{36}$ in Formula (1); and an X-ray diffraction intensity of {552} such that a sum of squares of the Miller indices becomes 54 is substituted, in units of cps, for $I_{54}$ in Formula (1).

Fn1 $(=I_{18}/(I_{18}+I_{36}+I_{54}))$ is an index that indicates the orientation tendency of {411} and {330}. That is, the larger the value of Fn1 is, the more Fn1 indicates that {411} and {330} are aligned in the same direction. Further, if Fn1 is 0.60 or more, the adhesion of the Zn—Ni alloy plating layer 100 markedly increases. Accordingly, in the present embodiment Fn1 that is determined based on the X-ray diffraction intensity of the Zn—Ni alloy plating layer 100 is made 0.60 or more.

A preferable lower limit of Fn1 is 0.65, more preferably is 0.70, further preferably is 0.75, more preferably is 0.80, further preferably is 0.85, and more preferably is 0.90. Note that, the upper limit of Fn1 is not particularly limited. Fn1 may be 1.00. However, in the oil-well metal pipe 1 according to the present embodiment, the upper limit of Fn1 is practically 0.99.

As described above, in the present description, the phrase "orientation of the Zn—Ni alloy plating layer 100" means the distribution state of the crystal orientations in the Zn—Ni alloy plating layer. In addition, the orientations of a material can be evaluated by XRD. On the other hand, in XRD, there are cases where some planes cannot be separated. Specifically, the Miller indices of an arbitrary plane are represented as (hkl). At this time, a single diffraction line is not obtained for each plane (hkl), but rather is obtained for each value of a sum of squares s of the Miller indices $(=h^2+k^2+l^2)$. That is, diffraction lines originating from planes having the same value for the sum of squares s of the Miller indices will be obtained as a single diffraction line.

In addition, planes (411), (141), and (114) which are in a symmetric relation are collectively referred to and represented by {411}. Likewise, planes (330), (303), and (033) which are in a symmetric relation are collectively referred to and represented by {330}. For each of {411} and {330}, s=18. Therefore, a diffraction line for which s=18 will be a line with respect to which a diffraction line originating from {411} and a diffraction line originating from {330} are superposed on each other. Further, for {442} which planes (442), (424), and (244) that are in a symmetric relation are collectively referred to as, and for {600} which planes (600), (060), and (006) that are in a symmetric relation are collectively referred to as, s=36. Therefore, a diffraction line for which s=36 will be a line with respect to which a diffraction line originating from {442} and a diffraction line originating from {600} are superposed on each other.

Thus, $I_{18}$ in Formula (1) is the sum total of the X-ray diffraction intensities of {411} and {330}. Likewise, $I_{36}$ in Formula (1) is the sum total of the X-ray diffraction intensities of {442} and {600}. Further, $I_{54}$ in Formula (1) is the sum total of the X-ray diffraction intensities of {552} which planes (552), (525), and (255) that are in a symmetric relation are collectively referred to as.

In the present embodiment, Fn1 can be determined by the following method. A test specimen is prepared from the pin contact surface 400 or the box contact surface 500 on which the Zn—Ni alloy plating layer 100 is formed in the oil-well metal pipe 1 according to the present embodiment. The size of the test specimen is not particularly limited, and for example is 15 mm×15 mm with a thickness of 2 mm. The surface of the Zn—Ni alloy plating layer 100 of the test specimen is subjected to X-ray diffraction measurement using an X-ray diffractometer. The X-ray diffraction measurement can be performed according to a well-known method. The X-ray diffractometer is not particularly limited, and for example RINT-2500 manufactured by Rigaku Corporation can be used. Further, in the present embodiment, the X-ray diffractometer target is not particularly limited. For example, Co may be adopted as the X-ray diffractometer target (Co-Kα radiation).

Diffraction peaks corresponding to s=18, 36, and 54 are identified from the X-ray diffraction spectra obtained by the X-ray diffraction measurement. The intensities of the identified diffraction peaks are determined, and defined as $I_{18}$, $I_{36}$, and $I_{54}$. Fn1 can be determined based on the obtained $I_{18}$, $I_{36}$, and $I_{54}$.

Figure 10:
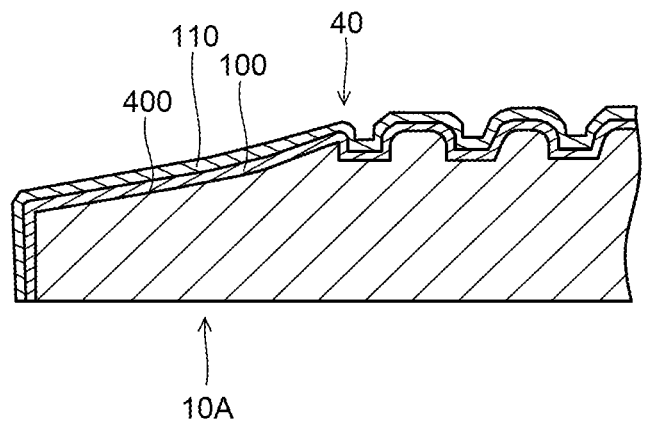
FIG. 10 is an enlarged view of a pin contact surface having a different structure from that in FIG. 8.
Figure 11:
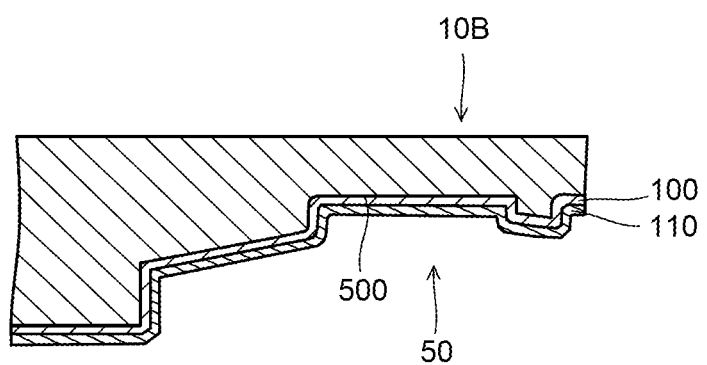
FIG. 11 is an enlarged view of a box contact surface having a different structure from that in FIG. 9.

Regarding Other Optional Structures of Oil-Well Metal Pipe 1 of the Present Embodiment Regarding Chemical Conversion Treatment Layer The oil-well metal pipe 1 of the present embodiment may further include a chemical conversion treatment layer 110 on the Zn—Ni alloy plating layer 100. Referring to FIG. 10, in a case where the Zn—Ni alloy plating layer 100 is formed on the pin contact surface 400, the chemical conversion treatment layer 110 may be formed on the Zn—Ni alloy plating layer 100. Further, referring to FIG. 11, in a case where the Zn—Ni alloy plating layer 100 is formed on the box contact surface 500, the chemical conversion treatment layer 110 may be formed on the Zn—Ni alloy plating layer 100.

The chemical conversion treatment layer 110 is not particularly limited, and may be a well-known chemical conversion treatment layer. The chemical conversion treatment layer 110 for example, may be an oxalate chemical conversion treatment layer, may be a phosphate chemical conversion treatment layer, may be a borate chemical conversion treatment layer, or may be a chromate coating. In a case where the chemical conversion treatment layer 110 is a chromate layer, preferably the chromate layer does not contain hexavalent chromium.

In some cases the oil-well metal pipe 1 will be stored outdoors for a long period of time until actually being used at the oil well drilling site. In a case where the oil-well metal pipe 1 is exposed to the atmosphere for a long period of time outdoors, the chemical conversion treatment layer 110 enhances the corrosion resistance of the pin contact surface 400, and can suppress the occurrence of rust (white rust) at the pin contact surface 400. The film thickness of the chemical conversion treatment layer 110 is not particularly limited. The film thickness of the chemical conversion treatment layer 110 is, for example, within the range of 10 to 200 nm.

Lubricant Coating

The oil-well metal pipe 1 may further include a lubricant coating 120 on the Zn—Ni alloy plating layer 100, on the chemical conversion treatment layer 110, or on a contact surface on which the Zn—Ni alloy plating layer 100 is not formed (on the pin contact surface 400 or on the box contact surface 500). The lubricant coating 120 further enhances the lubricity of the oil-well metal pipe 1.

Figure 12:
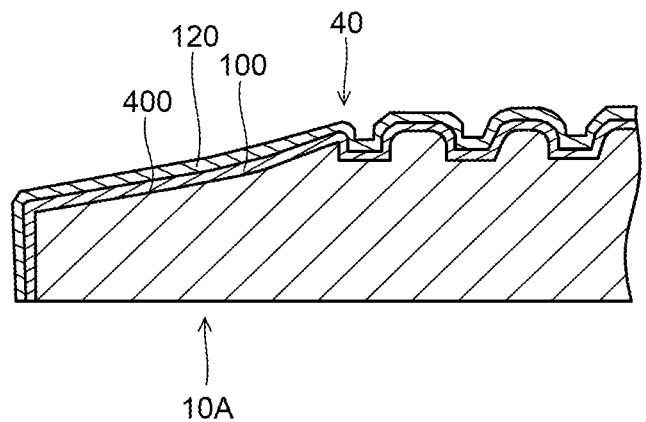
FIG. 12 is an enlarged view of a pin contact surface having a different structure from that in FIG. 8 and FIG. 10.

Referring to FIG. 12, in a case where the Zn—Ni alloy plating layer 100 is formed on the pin contact surface 400, the lubricant coating 120 may be formed on the chemical conversion treatment layer 110 formed on the Zn—Ni alloy plating layer 100. In other words, the lubricant coating 120 may be formed above the Zn—Ni alloy plating layer 100. Further, referring to FIG. 13, in a case where the Zn—Ni alloy plating layer 100 is formed on the box contact surface 500, the lubricant coating 120 may be formed on the Zn—Ni alloy plating layer 100. In other words, the lubricant coating 120 may be formed on the Zn—Ni alloy plating layer 100.

Figure 13:
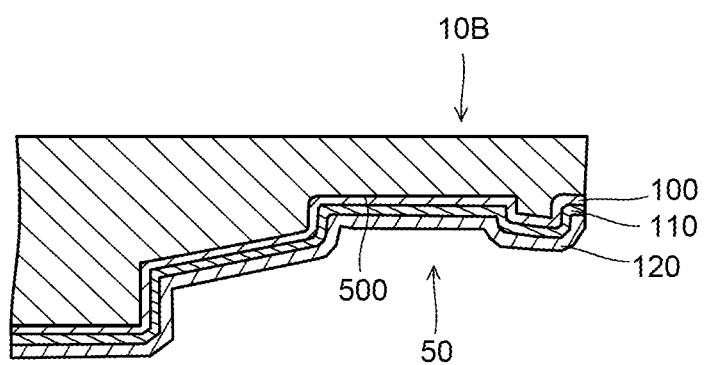
FIG. 13 is an enlarged view of a box contact surface having a different structure from that in FIG. 9 and FIG. 11.

Note that, the arrangement of the lubricant coating 120 is not limited to FIG. 12 and FIG. 13. In other words, the lubricant coating 120 may be formed on or above the pin contact surface 400 where the Zn—Ni alloy plating layer 100 is not formed, the lubricant coating 120 may be formed on or above the box contact surface 500 where the Zn—Ni alloy plating layer 100 is not formed, the lubricant coating 120 may be formed on or above the Zn—Ni alloy plating layer 100 formed on the pin contact surface 400, and the lubricant coating 120 may be formed on or above the Zn—Ni alloy plating layer 100 formed on the box contact surface 500.

The lubricant coating may be solid, or may be in a semi-solid state or a liquid state. A commercially available lubricant can be used as the lubricant coating. The lubricant coating contains, for example, lubricating particles and a binder. As necessary, the lubricant coating may contain a solvent and other components. The lubricating particles are not particularly limited as long as they are particles having lubricity. The lubricating particles are, for example, one or more types selected from the group consisting of particles of graphite, $MoS_2$ (molybdenum disulfide), $WS_2$ (tungsten disulfide), BN (boron nitride), PTFE (polytetrafluoroethylene), CFx (graphite fluoride), and $CaCO_3$ (calcium carbonate).

The binder, for example, is one or two types selected from the group consisting of an organic binder and an inorganic binder. The organic binder is, for example, one or two types selected from the group consisting of a thermosetting resin and a thermoplastic resin. The thermosetting resin, for example, is one or more types selected from the group consisting of polyethylene resin, polyimide resin and polyamide-imide resin. The inorganic binder, for example, is one or two types selected from the group consisting of compounds containing alkoxysilane and siloxane bonds. An example of a commercially available lubricant is SEAL-GUARD ECF (trade name) manufactured by JET-LUBE LLC. Other examples of the lubricant coating include a lubricant coating containing rosin, metallic soap, wax or a lubricant powder.

Method for Producing Oil-Well Metal Pipe 1

A method for producing the oil-well metal pipe 1 according to the present embodiment is described hereunder. Note that, as long as the oil-well metal pipe 1 of the present embodiment has the structure described above, a method for producing the oil-well metal pipe 1 is not limited to the following production method. However, the production method described hereunder is one favorable example for producing the oil-well metal pipe 1 of the present embodiment.

The method for producing the oil-well metal pipe 1 includes a preparation process (S1) of preparing a hollow shell in which the pin 40 or the box 50 is formed, and a Zn—Ni alloy plating layer formation process (S2). Hereunder, each process of the method for producing the oil-well metal pipe 1 of the present embodiment is described in detail.

Preparation Process (S1)

In the preparation process (S1), a hollow shell in which the pin 40 or the box 50 is formed is prepared. In the present description, the phrase "hollow shell in which the pin or the box is formed" means either of the pipe main body 10 and the pin tube body 11 in a T&C type oil-well metal pipe 1 and the pipe main body 10 in the integral type oil-well metal pipe 1.

The hollow shell in which the pin 40 or the box 50 is formed is produced, for example, by the following method. A starting material is produced using molten steel. Specifically, a cast piece (a slab, bloom or billet) is produced by a continuous casting process using the molten steel. An ingot may also be produced by an ingot-making process using the molten steel. As necessary, the slab, bloom or ingot may be subjected to blooming to produce a billet. The starting material (a slab, bloom or billet) is produced by the above described process. The prepared starting material is subjected to hot working to produce a hollow shell. The hot working method may be piercing-rolling by means of the Mannesmann process, or may be a hot-extrusion process. The hollow shell after hot working is subjected to well-known quenching and well-known tempering to adjust the strength of the hollow shell. A hollow shell is produced by the above process. Note that, in a case where the oil-well metal pipe 1 is the T&C type, a hollow shell for the coupling 12 is also prepared. The method for producing the hollow shell for the coupling 12 is the same as the method for producing the hollow shell that is described above.

In a case where the oil-well metal pipe 1 is the T&C type, threading is performed with respect to the outer surface of both end portions of the hollow shell for the pin tube body 11, to form the pin 40 that includes the pin contact surface 400. By means of the above process, a hollow shell (the pin tube body 11) in which the pin 40 is formed is prepared in a case where the oil-well metal pipe 1 is the T&C type. Note that, in a case where the oil-well metal pipe 1 is the T&C type, the coupling 12 may also be prepared. Specifically, threading is performed with respect to the inner surface of both end portions of the hollow shell for the coupling 12, to form the box 50 that includes the box contact surface 500. The coupling 12 is produced by the above process.

In a case where the oil-well metal pipe 1 is the integral type, threading is performed on the outer surface of the first end portion 10A of the hollow shell to form the pin 40 that includes the pin contact surface 400. In addition, threading is performed with respect to the inner surface of the second end portion 10B of the hollow shell to form the box 50 that includes the box contact surface 500. By means of the above process, in a case where the oil-well metal pipe 1 is the integral type, a hollow shell (pipe main body 10) in which the pin 40 and the box 50 are formed is prepared.

Other Optional Processes

The preparation process (S1) of the present embodiment may further include at least one of a grinding process and a Ni strike plating process.

In the case of performing a grinding process in the preparation process (S1) according to the present embodiment, for example, a sandblasting treatment, and finishing by machine grinding are performed in the grinding process. The sandblasting treatment is a treatment in which a blast material (abrasive) is mixed with compressed air and the mixture is propelled onto the contact surface. Examples of the blast material include spherical shot material and angular grid material. The surface roughness of the contact surface can be increased by the sandblasting treatment. The sandblasting treatment can be carried out by a well-known method. For example, air is compressed by a compressor, and the blast material is mixed with the compressed air. The blast material may be composed of, for example, stainless steel, aluminum, ceramic material, or alumina. The sandblasting treatment conditions such as the propelling speed are not particularly limited, and can be appropriately adjusted according to well-known conditions.

In the Ni strike plating process, a Ni strike plating layer is formed on the surface of the hollow shell. The Ni strike plating layer is an extremely thin undercoat plating layer, and increases the adhesion of the Zn—Ni alloy plating layer 100 that is described later. Note that, the plating bath to be used in the Ni strike plating process is not particularly limited, and a well-known bath can be used. Further, the conditions for forming the Ni strike plating layer are not particularly limited, and can be appropriately adjusted and set.

Note that, in a case where an Ni strike plating process is performed, an Ni strike plating layer is formed between the pipe main body 10 and the Zn—Ni alloy plating layer 100. On the other hand, the thickness of the formed Ni strike plating layer is negligibly thin in comparison to the thickness of the Zn—Ni alloy plating layer 100. In other words, in the oil-well metal pipe 1 according to the present embodiment, an Ni strike plating layer may be included in the Zn—Ni alloy plating layer 100.

Zn—Ni Alloy Plating Layer Formation Process (S2)

In the Zn—Ni alloy plating layer formation process (S2), the Zn—Ni alloy plating layer 100 is formed by electroplating on the pin contact surface 400 of the hollow shell in which the pin 40 is formed and/or on the box contact surface 500 of the hollow shell in which the box 50 is formed, after the preparation process (S1).

In the Zn—Ni alloy plating layer formation process (S2), the Zn—Ni alloy plating layer 100 is formed using a plating bath containing zinc ions and nickel ions. The counter anions to the zinc ions and nickel ions are not particularly limited. For example, chloride ions or sulfate ions may be used as counter anions. That is, in the Zn—Ni alloy plating layer formation process (S2) according to the present embodiment, a chloride bath or a sulfate bath may be used as the plating bath.

Hereunder, specifically, a case of using a chloride bath as one example of the plating bath will be described. When using a chloride bath, it is preferable that a brightening agent is not contained in the plating bath. In addition, in this case, preferably the metal ion concentration in the plating bath is high. That is, when using a chloride bath, specifically, it is preferable that the plating bath is one in which the sum of the zinc ion concentration and the nickel ion concentration is 30 g/L or more, and the concentration (g/L) of zinc ions is higher than the concentration (g/L) of nickel ions, and that the plating bath does not contain a brightening agent. In this case, in the Zn—Ni alloy plating layer 100 that is formed, Fn1 can be consistently made 0.60 or more.

Further specifically, in the Zn—Ni alloy plating layer formation process (S2) according to the present embodiment, for example, a plating bath that contains zinc ions: 40 g/L, nickel ions: 30 g/L, and ammonium chloride: 240 g/L, and does not contain a brightening agent can be used. Note that, as mentioned above, in the Zn—Ni alloy plating layer formation process (S2) according to the present embodiment, the plating bath is not limited to a chloride bath, and a sulfate bath may be used, or another kind of plating bath can be used.

The conditions of the electroplating in the Zn—Ni alloy plating layer formation process (S2) are not particularly limited, and can be appropriately adjusted according to well-known conditions. The electroplating conditions are, for example, a plating bath pH of 1 to 10, a plating bath temperature of 10 to 60° C., a current density of 1 to 100 A/dm$^2$, and a treatment time of 0.1 to 30 minutes. In the case of forming the Zn—Ni alloy plating layer 100 on the pin contact surface 400, the pin contact surface 400 is immersed in the aforementioned plating bath and electroplating is performed. On the other hand, in the case of forming the Zn—Ni alloy plating layer 100 on the box contact surface 500, the box contact surface 500 is immersed in the aforementioned plating bath and electroplating is performed.

The oil-well metal pipe 1 of the present embodiment having the structure described above is produced by the production processes that are described above. Note that, the aforementioned production processes are one example of production processes for producing the oil-well metal pipe 1 according to the present embodiment, and a method for producing the oil-well metal pipe 1 according to the present embodiment is not limited to the production method described above.

Other Optional Processes

In the method for producing the oil-well metal pipe 1 according to the present embodiment, at least one process among the following chemical conversion treatment process and film formation process may also be performed. These processes are optional processes. Accordingly, these processes need not be performed.

Chemical Conversion Treatment Process

In the production method of the present embodiment, as necessary, a chemical conversion treatment process may be performed. That is, the chemical conversion treatment process is an optional process. In the case of performing a chemical conversion treatment process, the chemical conversion treatment layer 110 is formed on the Zn—Ni alloy plating layer 100. In the chemical conversion treatment process, it suffices to perform a well-known chemical conversion treatment. The chemical conversion treatment, for example, may be an oxalate chemical conversion treatment, may be a phosphate chemical conversion treatment, or may be a borate chemical conversion treatment. For example, in the case of performing a phosphate chemical conversion treatment, a chemical conversion treatment that uses zinc phosphate may be performed, a chemical conversion treatment that uses manganese phosphate may be performed, or a chemical conversion treatment that uses calcium zinc phosphate may be performed.

Specifically, in the case of performing a zinc phosphate chemical conversion treatment, as a treatment solution, for example, a chemical conversion treatment solution containing 1 to 150 g/L of phosphate ions, 3 to 70 g/L of zinc ions, 1 to 100 g/L of nitrate ions, and 0 to 30 g/L of nickel ions can be used. In this case, the temperature of the chemical conversion treatment solution is for example, 20 to 100° C. The chemical conversion treatment layer 110 can be formed by appropriately setting well-known conditions and performing a chemical conversion treatment in this way.

Film Formation Process

As necessary, the production method of the present embodiment may include performance of a film formation process. In other words, the film formation process is an optional process. In the film formation process, a lubricant coating is formed on the Zn—Ni alloy plating layer 100 and/or on the chemical conversion treatment layer 110 and/or on a contact surface (pin contact surface 400 or box contact surface 500) on which the Zn—Ni alloy plating layer 100 is not formed.

In the film formation process, a lubricant or a composition containing the components of the aforementioned lubricant coating is applied. By this means a lubricant coating is formed. The application method is not particularly limited. Examples of the application method include spray coating, brushing, and immersion. When adopting spray coating as the application method, the composition or lubricant may be heated and then sprayed in a state in which the flowability has been increased. The composition or lubricant is then dried to form a lubricant coating.

The oil-well metal pipe 1 of the present embodiment are described more specifically hereunder by way of examples. The conditions adopted in the following examples are one example of conditions which are employed for confirming the workability and advantageous effects of the oil-well metal pipe 1 of the present embodiment. Accordingly, the oil-well metal pipe 1 of the present embodiment is not limited to this one example of the conditions.

EXAMPLES

In the present examples, Zn—Ni alloy plating layers were formed on steel sheets simulating a contact surface, and the adhesion of each Zn—Ni alloy plating layer was evaluated. Specifically, the steel sheet was a cold-rolled steel sheet, and the chemical composition of the steel sheet was $C \leq 0.15\%$, $Mn \leq 0.60\%$, $P \leq 0.100\%$, and $S \leq 0.050\%$, with the balance being Fe and impurities.

As a preconditioning treatment, the steel sheet of each test number was subjected to electrolytic degreasing, hydrochloric acid pickling, and Ni strike plating. The treatment time of the Ni strike plating is shown in the "Preconditioning Treatment (minutes)" column in Table 1. Note that, the symbol "-" in the "Preconditioning Treatment (minutes)" column in Table 1 means that Ni strike plating was not performed.

TABLE 1

| Test Number | Preconditioning Treatment (minutes) | Plating Bath | X-ray Diffraction Intensity (cps) | | | Fn1 | Adhesion Evaluation |
|---|---|---|---|---|---|---|---|
| | | | $I_{18}$ | $I_{36}$ | $I_{54}$ | | |
| 1 | — | A | 11961 | 178 | 588 | 0.94 | 2 |
| 2 | 3.0 | A | 18832 | 128 | 475 | 0.97 | 0 |
| 3 | 0.5 | A | 27574 | 130 | 425 | 0.98 | 1 |
| 4 | — | A | 14190 | 169 | 545 | 0.95 | 2 |
| 5 | 3.0 | A | 22229 | 138 | 503 | 0.97 | 0 |
| 6 | 0.5 | A | 15095 | 169 | 542 | 0.96 | 2 |
| 7 | — | B | 3059 | 4494 | 376 | 0.39 | 4 |
| 8 | 3.0 | B | 2099 | 7598 | 312 | 0.21 | 5 |
| 9 | 0.5 | B | 2377 | 4921 | 352 | 0.31 | 4 |

A Zn—Ni alloy plating layer was formed on the steel sheet of each test number using a plating bath described in Table 1. Note that, the thickness of the Zn—Ni alloy plating layer was approximately 10 μm for each of the plating baths that were used. In addition, the Ni ratio in the Zn—Ni alloy plating layer was 12 to 16% by mass. Specifically, plating baths "A" and "B" were as described hereunder.

Plating Bath A

A plating bath "DAIN ZINALLOY N2-PL" (product name) manufactured by Daiwa Fine Chemicals Co., Ltd. (Laboratory) was used as plating bath A. Plating bath A was a chloride bath, and did not contain a brightening agent. In addition, in plating bath A, the sum of the zinc ion concentration and the nickel ion concentration was 30 g/L or more, and the concentration (g/L) of zinc ions was higher than the concentration (g/L) of nickel ions. Note that, the electroplating conditions in the case of using plating bath A were set as follows: plating bath pH: 5.8, plating bath temperature: 40° C., current density: 6 A/dm$^2$, and treatment time: 8 minutes.

Plating Bath B

A plating bath "DAIN ZINALLOY N-PL" (product name) manufactured by Daiwa Fine Chemicals Co., Ltd. (Laboratory) was used as plating bath B. Plating bath B was a chloride bath, and contained a brightening agent. In addition, in plating bath B, although the sum of the zinc ion concentration and the nickel ion concentration was 30 g/L or more, the concentration (g/L) of zinc ions was lower than the concentration (g/L) of nickel ions. Note that, the electroplating conditions in the case of using plating bath B were set as follows: plating bath pH: 6.4, plating bath temperature: 25° C., current density: 2 A/dm$^2$, and treatment time: 20 minutes.

The steel sheet of each test number on which a Zn—Ni alloy plating layer was formed in the manner described above was subjected to an X-ray diffraction intensity measurement test by XRD, and an adhesion test.

X-Ray Diffraction Intensity Measurement Test

The steel sheet of each test number was subjected to an X-ray diffraction intensity measurement test according to the method described above, and Fn1 was determined. Specifically, the steel sheet of each test number was subjected to X-ray diffraction measurement using an X-ray diffractometer. RINT-2500 manufactured by Rigaku Corporation was used as the X-ray diffractometer. Further, Co was adopted as the target (Co-Kα radiation) in the X-ray diffraction measurement. Diffraction peaks corresponding to s=18, 36, and 54 were identified from the X-ray diffraction spectra obtained by the X-ray diffraction measurement. The intensities of the identified diffraction peaks were determined, and defined as $I_{18}$, $I_{36}$, and $I_{54}$. Fn1 was determined based on the obtained $I_{18}$, $I_{36}$, and $I_{54}$. The obtained $I_{18}$, $I_{36}$, $I_{54}$, and Fn1 for the steel sheet of each test number are shown in Table 1.

Adhesion Test

An adhesion test in accordance with the cross-cut method defined in JIS K 5600-5-6 (1999) was conducted on the steel sheet of each test number. Specifically, a cutter blade was used to make slits in the Zn—Ni alloy plating layer of the steel sheet of each test number from the direction perpendicular thereto. After making six parallel slits at intervals of approximately 1 mm, the direction was changed by 90° and six slits which were orthogonal to the aforementioned six slits were made at intervals of approximately 1 mm. A transparent adhesive tape was attached to the region in which the slits had been made, and thereafter the adhesive tape was pulled off from the aforementioned region within 5 minutes. The surface of the steel sheet of each test number was visually observed after the adhesive tape was pulled off, and the test results were classified into the 6 levels of 0 to 5 according to the criteria of JIS K 5600-5-6 (1999). Note that, the classification for the least amount of peeling is "0", and the classification for the most amount of peeling is "5". The obtained test results are shown in the "Adhesion Evaluation" column of Table 1.

Evaluation Results

Referring to Table 1, in the steel sheets of Test Numbers 1 to 6, the X-ray diffraction intensities of the Zn—Ni alloy plating layer satisfied Formula (1). Consequently, the respective adhesion evaluations in the adhesion test were in the range of 0 to 2. That is, the Zn—Ni alloy plating layers of Test Numbers 1 to 6 had high adhesion.

In contrast, in the steel sheets of Test Numbers 7 to 9, the X-ray diffraction intensities of the Zn—Ni alloy plating layer did not satisfy Formula (1). Consequently, the respective adhesion evaluations in the adhesion test were 4 or 5. That is, the Zn—Ni alloy plating layers of Test Numbers 7 to 9 did not have high adhesion.

An embodiment of the present disclosure has been described above. However, the foregoing embodiment is merely an example for implementing the present disclosure. Accordingly, the present disclosure is not limited to the above embodiment, and the above embodiment can be appropriately modified within a range which does not deviate from the gist of the present disclosure.

REFERENCE SIGNS LIST

1 Oil-well metal pipe
10 Pipe Main Body
10A First End Portion
10B Second End Portion
40 Pin
41 External Thread Part
50 Box
51 Internal Thread part
100 Zn—Ni alloy Plating Layer
110 Chemical Conversion Treatment Layer
120 Lubricant Coating
400 Pin Contact Surface
500 Box Contact Surface

The invention claimed is:

1. An oil-well metal pipe, comprising:
a pipe main body including a first end portion and a second end portion,
wherein
the pipe main body includes:
a pin formed at the first end portion; and
a box formed at the second end portion,
the pin includes:
a pin contact surface including an external thread part, and
the box includes:
a box contact surface including an internal thread part,
the oil-well metal pipe further comprising:
a Zn—Ni alloy plating layer formed on at least one of the pin contact surface and the box contact surface,
wherein X-ray diffraction intensities of the Zn—Ni alloy plating layer satisfy Formula (1):

$$I_{18}/(I_{18} + I_{36} + I_{54}) \geq 0.60 \tag{1}$$

where, an X-ray diffraction intensity of {411} and {330} such that a sum of squares of the Miller indices becomes 18 is substituted, in units of cps, for $I_{18}$ in Formula (1); an X-ray diffraction intensity of {442} and {600} such that a sum of squares of the Miller indices becomes 36 is substituted, in units of cps, for $I_{36}$ in Formula (1); and an X-ray diffraction intensity of {552} such that a sum of squares of the Miller indices becomes 54 is substituted, in units of cps, for $I_{54}$ in Formula (1).

2. The oil-well metal pipe according to claim 1, wherein a thickness of the Zn—Ni alloy plating layer is within a range of 5 to 25 µm.

3. The oil-well metal pipe according to claim 1, further comprising:
a lubricant coating on or above the Zn—Ni alloy plating layer.

4. The oil-well metal pipe according to claim 2, further comprising:
a lubricant coating on or above the Zn—Ni alloy plating layer.

* * * * *